United States Patent Office 3,393,590
Patented July 23, 1968

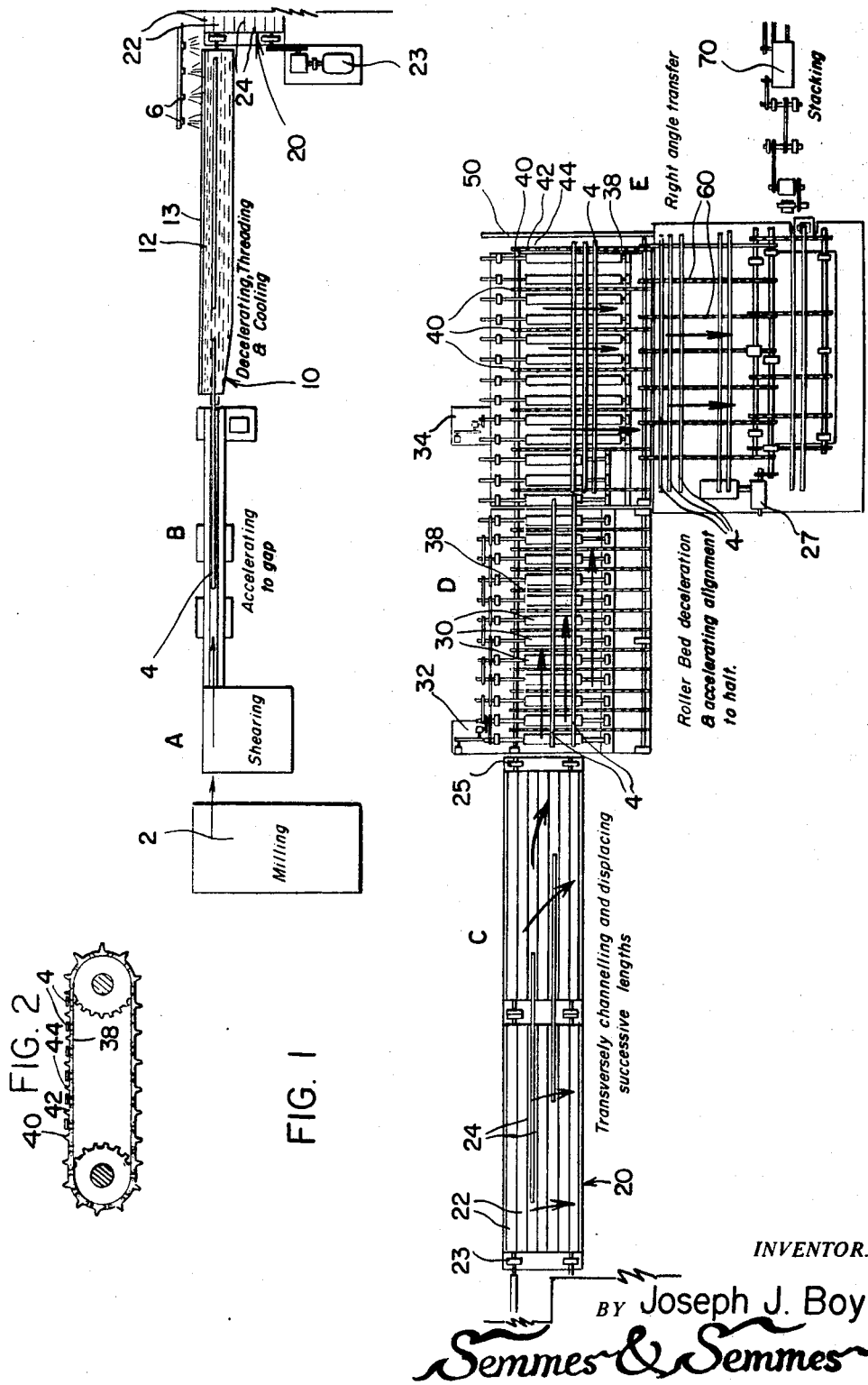

3,393,590
STRIP CONVEYANCE
Joseph J. Boyd, Fairburn, Ga., assignor to Atlantic Steel Company, Atlanta, Ga., a corporation of Delaware
Filed May 9, 1966, Ser. No. 548,449
15 Claims. (Cl. 83—26)

The present invention relates to the method and preferred apparatus for finishing, sorting, cooling, straightening, stacking and packaging flexible material. The material may consist of red hot metal strips, for example, which leave the rolling mill at very high speeds.

In the handling of finished material, such as steel merchant bars from a mill, it is customary to run the finished material out to great lengths on a cooling bed or to coil it onto reels. Following cooling, it is sheared to mill length, straightened if required, and tied into bundles convenient for handling by crane or by hand.

Obviously, these manual operations require expensive handling procedures. The present invention eliminates this, and provides for continued shearing, collecting, and packaging mill automation.

Whereas basic products such as reinforcing bars require shearing to lengths such as necessitate only a few heavy tie wires around a five or ten ton lift, the customary processing of thin bands such as cotton ties, requires the following complexity of steps: Cutting to lengths of about 12' and smaller; sorting the sheared or cut lengths into stacks of ten; folding plural stacks of ten upon themselves and about the center, as for example, three stacks of ten.

At times, the trade requires threading cotton tie buckles into the bundle. These buckles are normally slid onto one of the central of the plural folded ties. The packaging is completed by securely tying the hand bundle so formed with three wires or bands; and collecting fifty or more of the hand bundles into a crane lift and spraying with rust preventatives. Manual cutting and bundling of similar milled products has heretofore been considered essential, even among those who have attempted to increase the tonnage per man hour, and reduce the cost on the rolling mill itself.

The object of this invention is to automate the cutting or shearing and stacking of the rolled product, and to provide a process which is an automated continuation of the rolling mill.

This and other objects of the invention will be apparent from the following specification, in which:

FIGURE 1 is a diagram illustrating the automatic cutting-stacking process and apparatus;

FIGURE 2 is a side vew of the roller bed and right angle transfer chains.

The process and apparatus herein described is that which is used for the more complicated cotton shear line, but it is to be understood that no such limitation of the invention is intended, since it would perform equally well on any shape and size material that can be controllably sheared at full speed off the rolling mill, as well as any length of cut which the cooling bed is designed to take.

In this process, the rolled section from the finishing mill 2 is passed through the shearing process A which is timed to cut every piece of the stock to the same length. To accomplish this, a rotary shear is used, the same being controlled to rotate at a definite ratio with respect to the finishing mill stand speed. Alternatively, the shearing may be effected by a flying shear, triggered by the rolled section of stock itself. The shearing is, of course, adjustable; the rate may be varied by either a change of ratio between milling and shearing, or as in the instance of a flying shear, by shifting the position of the indicating control switch or pick up.

In shearing cotton ties, and such material, one has the problem of conveying stock which is generally approximately .030 inch thick; the width varying from 1" to 1½", and length varying between 7' and 20'. The strip speed is coordinate with the milling and may vary from zero to 2500 feet of the stock per minute. Another problem in conveying such materials from the shearing step, lies in the handling of the high-temperature material, and in the prevention of overlapping of sheared ties.

To prevent overlapping prior to cooling and stacking, the sheared tie is initially accelerated from the calculated speed of shearing by a tie supporting belt conveyance B. This forms gaps between respective sheared ties 4. The accelerated conveyance step is coactive with the shearing step and involves slidably supporting and driving the ties by the greater surface speed of the conveyor exceeding the surface speed of the ties. If no gap is developed between respective ties, it would be difficult to separate the ties for later transfer into the ultimate stacking operation; hence the necessity here of accelerating one tie immediately as sheared from a succeeding tie. Whereas it is essential to pull a gap between ends of light cut strip to allow space for switching each strip into its own channel, the gap may not be necessary for the switching of heavy products.

Following accelerated conveyance to form the gap, the strips are cooled by water jets 6 and threading of the red hot strips is effected. The front ends of the rapidly moving ties successively enter consecutive channels 22 of a transversely moving channel bed 20 made up of many U-shaped channels placed side by side on chains and arranged so that the length of the channels are in the direction of motion of the tie. At this point the tie, traveling in an axial direction, is forced sideways by edge 24 of the moving channel and given a transverse velocity.

For high speed, light-weight strips, cut to short lengths, special care must be exercised in threading, for if the tie is allowed to ripple, flex, or vibrate, or if it becomes airborne, it will pile up and jam the machinery. The sudden transverse acceleration is prevented from deforming the tie by first passing the tie over an immovable plate 10 at B1 having a film of liquid 12, preferably water, thereover. This reduces the friction between the tie and plate.

The phenomenon of the spheroidal state is utilized to create the relative friction-free movement of the tie. All volatile liquids can assume this spheroidal condition; the lowest temperature at which it can be produced varies with each liquid and more elevated the higher the boiling point of the liquid. The temperature of a liquid in the spheroidal state is always below its boiling point.

In the spheroidal state, liquid globules are produced by the red-hot tie and liquid fluid, which rests upon a sort of cushion of its own vapor 13 produced by the heat radiated from the hot surface against it. As fast as this vapor escapes from the globule, its place is supplied by a fresh quantity formed in the same way, so that the globule is constantly supported by it, and does not come in actual contact with the heated surface.

The tie 4 thus travels along the vapor interface 13 created between it and the surface of the liquid. The fast-moving tie, in close contact with plate 10, creates a partial vacuum between the tie and plate, and atmospheric pressure forces the tie and plate towards each other. This stabilizes the tie and prevents rippling, flexing or vibration thereof, as illustrated in FIG. 2. The water film also helps to seal the edges, supplies lubrication, and cools the plate.

The combined effects of the red-hot material striking the thin film of liquid and causing the creation of a vapor interface between the opposite liquid and tie surfaces, and the relative speed between the tie and plate causing a low pressure or partial vacuum area, creates a sucking-down of the tie, and results in an almost frictionless, flattening influence upon the tie. Thus, threading and transverse acceleration are simultaneously accomplished in a very efficient and effective manner.

If the tie speed is sufficiently high, the liquid is not necessary because the suction between the plate and tie, developed as a result of the decrease in pressure therebetween, depends upon the relative speed between the tie and plate. Also, the highly viscous hot air sucked in acts as a lubricant.

The channel bed is synchronized with the shear so that each time a tie is cut, a slot or channel on the bed moves into position to receive it. The channel bed not only follows in exact step with the shear but remains same definite phase angle behind it. This angle is adjustable to allow for variations in speed, cuts per minute and friction.

As indicated, each piece of sheared stock is threaded into an individual channel, preventing it from becoming entangled with succeeding pieces. Moreover, by this channeling the respective pieces of stock are straightened, spaced and thus made available for inspection, counting and sequential stacking. As will be obvious from reference to the length of travel of the strip, not only does this channeling separate the pieces of stock, but it also further slows their initial movement appreciably. The length of the channel bed is so constructed that most of the forward speed (initial speed) of the sheared stock is thus dissipated by friction contact of the bottom and edges of the strip with corresponding channel floor and walls. The slowest moving strips still have sufficient momentum to pass them onto the succeeding bed in this process of cooling, counting and stacking.

Dependent upon the type of product, the channel bed shall be either long or short; for example, for stiff, slow stock such as package merchant bar, the channel bed with respective channels need only be equivalent to the length of the respective pieces of stock. On the other hand, for high-speed products such as cotton tie, it is desirable to present long channels to the stock for deceleration by friction engagement with the three sides of the respective channels. To effect the desired disposition of the strip 4 in the channel bed, the speed ratio between the respective shearing, conveying and channel bed motors must be constant and not variable; however, preselected. This does not preclude a variation in speed between the finishing stand of the mill and the shear, the conveyor and the channel bed driving elements.

In the chain of events following channel transfer and precedent to stacking, it is desired to further decelerate, to align and then to fully transfer the respective ties in a direction which is at right angles to the direction of delivery from the milling and shearing machines. To effect this, the respective displaced strips 4 slide onto plural supporting rollers 30, between coordinately moving transfer conveyors described hereinafter.

In practice, the plural rollers 30 over which the sheared stock now passes are progressively synchronized in speed such that the rollers first met are turning at a surface speed slower than the faster ties and faster than the slower ties. Successive rollers decrease in speed. This is accomplished by varying the speeds of motors 32 and 34. The slower moving strip stock is thus speeded-up and the faster stock is slowed down, thereby quickly bringing all of the ties to a more uniform forward slow speed precedent to arresting movement altogether in the initial direction.

The transfer conveyor D is provided with aligned sets of dogs 40, 42, etc. which rotate between the rollers in a transverse direction as shown in FIG. 2. Ideally, the triangularly shaped dogs on chains 38 are aligned and form a trough for each strip 4, the sheared strips remaining separated. Thus, successive strips from channels 22 are fed into successive troughs of the roller bed D. Since the direction of movement of the chain-dog trough combination is perpendicular to the direction of rotation of rollers 30, strips 4 are conveyed across the roller bed in a transverse direction until they hit stop 50. At that point, all of the strips 4 are aligned endwise, and are consecutively transferred to chain-dog troughs 60 for translation to the inspection and stacking operation 70.

Motors 32 and 34 drive rollers 30 and motors 23 and 25 drive the channel bed and chain-dog trough conveyors 40, 42, etc. Motor 27 is provided to drive chain-dog trough conveyors 60. Other process steps are provided with conventional motors as required; for examples steps 2; A and B.

Having thus described the invention, I claim the following:

1. A method of conveying flexible strip materials formed from an endless milling source, the steps of:
   A. shearing the material at a high rate of lineal velocity of the materials; thereafter
   B. accelerating the lineal velocity thereof by slidable friction supporting engagement, to form gaps between respective sheared ends thereof; sequentially,
   C. threading same while maintaining same against distortion; thereafter
   D. transversely channeling and displacing successive lengths thereof; thereafter
   E. decelerating the lineal velocity thereof by slidable friction supporting engagement to effect endwise alignment of respective lengths;
   F. sequentially stopping the lineal movement thereof;
   G. conveying parallel sheared lengths in a direction which is angular to the initial lineal direction, and
   H. stacking.

2. The method of claim 1 in which the respective shearing, channeling and angular conveying means are synchronized to capture the lengths against unguided movement in a plane transverse to the initial direction of movement.

3. The method of conveying sheared lengths of flexible sheet materials at high speeds for packaging thereof, comprising the steps of:
   A. shearing predetermined lengths at a high rate of speed;
   B. sequentially accelerating sheared lengths uni-directionally with respect to the direction of shear; thereby to establish gaps between sheared lengths;
   C. thereafter transferring said lengths by channelizing and shifting same transversely of the direction of movement simultaneously while moving longitudinally;
   D. thereafter adjusting the rate of movement of respective lengths for endwise alignment precedent to stacking and stacking same.

4. The method according to claim 1 in which the respective shearing conveying and transfer means are synchronized in time dwell.

5. A method for conveying sheared lengths of flexible sheet material at high speeds for packaging thereof comprising the steps of:
   A. shearing predetermined lengths at a high rate of speed;
   B. sequentially accelerating the sheared lengths, forming gaps therebetween;
   C. threading the sheared lengths sequentially into successive channels of a bed moving transversely to the initial direction of said lengths; thereafter
   D. adjusting the rate of movement of the lengths for endwise alignment.

6. The method of claim 5, wherein the shearing, accelerating, and threading steps are synchronized in time dwell.

7. The method as described in claim 5, further comprising:
   E. transferring the lengths at right angles to the initial direction thereof.

8. The method as described in claim 5 further comprising:
  F. translating the lengths over a film of liquid before channeling, heating thereby the liquid film to the spheroidal state, producing a vapor interface between the strip and liquid film; and simultaneously
  G. creating a low pressure area between the strip and liquid film, causing said strip to travel across the vapor interface avoiding contact with said liquid film, the low pressure area rigidifying the strip, effecting efficient threading.

9. The process as described in claim 5 further comprising adjusting the rate of movement of the lengths for endwise alignment by decelerating the lineal velocity thereof by slidable friction supporting engagement to effetc transverse movement of the respective lengths;
  E. sequentially stopping the lineal movement of said lengths;
  F. conveying parallel sheared lengths in a direction which is angular to the initial lineal direction; and
  G. stacking.

10. The method as described in claim 9 wherein the respective shearing, accelerating, threading, decelerating, conveying and stacking steps are time synchronized.

11. A system to convey flexible strip lengths of materials, which comprises:
  A. a shearing machine to cut predetermined lengths of said material at a high rate of speed and feed them uni-directionally;
  B. an acceleration conveyor to frictionally engage successive lengths whereby a gap is formed therebetween;
  C. means to feed successive lengths from said shearing apparatus to said accelerator conveyor;
  D. threading apparatus in operable relationship to said accelerating conveyor to thread said successive strips into a channel bed, said channel bed comprising an endless series of horizontal channels;
  E. means to rotate said channel bed in a direction transverse to the direction of travel of said lengths whereby successive lengths are fed into successive horizontal channels;
  F. roller bed deceleration means comprising a plurality of rollers with variable speeds, said rollers being positioned to accept said lengths from said channel bed; said roller bed further comprising trough means rotating perpendicularly to said roller means, whereby said lengths from said channel bed enter successive trough means, the combination of the trough means and rollers transversely translating said lengths at right angles;
  G. stop means at the end of said roller bed to bring said lengths to a halt, whereby said lengths are aligned endwise.

12. The system as described in claim 11 wherein said lengths comprise high temperature metal; and wherein said threading apparatus comprises a plate of metal, said plate being flooded with a film of liquid, whereby translation of said successive lengths across said flooded plate at high speeds heats said liquid to the spheroidal state, and creates a low pressure area between said lengths and said plate, whereby said lengths are threaded into said channel bed in a frictionless and distortionless manner.

13. The system as described in claim 11, wherein said acceleration conveyor comprises an endless belt.

14. The system as described in claim 11, wherein said roller bed comprises a plurality of rollers positioned, with respect to their radial axes, perpendicularly to the channels of said channel bed, and wherein said trough means comprise a plurality of chains positioned in between said plurality of roller means; each of said chains having a plurality of dogs secured thereto defining a trough across said plurality of rollers, whereby said lengths travel from said channels across said rollers, through said troughs.

15. The system as described in claim 13 wherein additional trough means are provided, whereby when said lengths are aligned endwise, they are automatically fed to successive troughs for conveyance to the stacking apparatus.

References Cited

UNITED STATES PATENTS

| | | | |
|---|---|---|---|
| 653,506 | 7/1900 | Edwards | 83—158 X |
| 3,039,584 | 7/1962 | McConnel et al. | 100—7 X |
| 3,127,829 | 4/1964 | Rossi | 100—7 X |
| 3,147,693 | 9/1964 | Renk | 100—7 |

FOREIGN PATENTS 1,184,183   9/1953   Germany.

WILLIAM S. LAWSON, *Primary Examiner.*